US007453771B2

(12) United States Patent
Gatz

(10) Patent No.: US 7,453,771 B2
(45) Date of Patent: Nov. 18, 2008

(54) APPARATUS AND METHOD FOR REDUCING NOISE FOR MOVEABLE TARGET

(75) Inventor: Michael C. Gatz, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 388 days.

(21) Appl. No.: 11/305,995

(22) Filed: Dec. 19, 2005

(65) Prior Publication Data

US 2007/0140060 A1 Jun. 21, 2007

(51) Int. Cl.
*G01S 3/802* (2006.01)

(52) U.S. Cl. ...................................... 367/127; 367/901

(58) Field of Classification Search ................. 367/901, 367/127, 136; 342/61, 109; 381/71.7, 71.1, 381/94.1
See application file for complete search history.

(56) References Cited

U.S. PATENT DOCUMENTS 5,444,786 A 8/1995 Raviv
5,568,557 A 10/1996 Ross et al.
5,848,169 A 12/1998 Clark, Jr. et al.
5,872,853 A 2/1999 Marquiss
6,748,086 B1 6/2004 Venkatesh et al.
2003/0142837 A1 7/2003 Kondo
2004/0062403 A1 4/2004 Gay
2004/0073360 A1 * 4/2004 Foxlin ................... 342/357.07
2005/0141731 A1 6/2005 Hamalainen
2005/0147258 A1 7/2005 Myllyla et al.
2005/0226434 A1 10/2005 Franz et al.
2007/0140060 A1 * 6/2007 Gatz .......................... 367/901

* cited by examiner

*Primary Examiner*—Dan Pihulic
(74) *Attorney, Agent, or Firm*—Finnegan, Henderson, Farabow, Garrett & Dunner

(57) ABSTRACT

A noise control system is provided for controlling a noise level around a moveable target. The noise control system has a detecting system configured to detect a location and movement of the target, and a noise cancellation system. The noise cancellation system has a sensor for dynamically sensing noise at the location of the target. The noise cancellation system is configured to be responsive to detection of the location of the target by the detecting system and the sensed noise to provide a noise cancellation wave to a first space at and around the location of the target. The noise cancellation system is further configured to be responsive to detection of the movement of the target by the detecting system and the sensed noise, and to provide a noise cancellation wave to a second space to cover the moving target. The second space is larger than the first space.

29 Claims, 3 Drawing Sheets

APPARATUS AND METHOD FOR REDUCING NOISE FOR MOVEABLE TARGET

TECHNICAL FIELD

The present disclosure is directed to noise reduction apparatus and methods, and more particularly, to an apparatus and method for reducing noise for a moveable target.

BACKGROUND

Active noise cancellation is a method for reducing unwanted sound. Sound consists of vibrations in the air, which can be represented as a wave. If a speaker emits a sound whose wave has the same amplitude and an exact opposite polarity to the original sound, the waves cancel out and the result is no sound. A computer analyzes the waveform of the background aural or nonaural noise, then generates a similar waveform rotated 180 degrees out of phase to cancel background noise out by interference. This method differs from passive "noise cancellation" (sound proofing) such as insulation, sound-absorbing ceiling tiles, automobile mufflers or using headphones to suppress the noise. The advantages of active noise control methods compared to passive ones are: they are more effective, less bulky, and can be made to be selective, that is, to block unwanted noise (e.g. from an engine) but not useful sound (e.g. voice).

Active noise cancellation involves superimposing on a noise acoustic wave an opposite acoustic wave that destructively interferes with and cancels the noise acoustic wave. In active noise cancellation systems, the characteristics of the noise acoustic wave are sensed, a canceling acoustic wave is generated and delivered to a location through a speaker. The combined waves are monitored at the location and a feedback or error signal is produced for interactive adjustment of the cancellation of the noise acoustic wave.

Implementation of the active noise cancellation principle is arranged to accommodate changes in the frequency and intensity characteristics of the noise acoustic wave by incorporating adaptability into the feedback or error path of the active noise cancellation system.

Active noise cancellation systems generally provide only a relatively small and geographically fixed volume of "quiet space". In a larger environment, this space would not accommodate the normal movement of an item or person within that larger space. Thus, with current technology, the quiet space is relatively small and fixed, and if the target moves outside this space, there is little or no reduction of noise.

U.S. Patent Application Publication No. US 2005/0226434, describes a noise reduction system employed in a working environment to reduce the noise that a user within that working environment experiences. The system determines the user's location within the working environment and produce a remedial noise profile that is configured to reduce the noise that the user experiences at the user's current location. The noise reduction system includes multiple speakers installed in the working environment. A signal that represents the remedial noise profile is used to drive one or more speakers proximate the user's current location so that the user experiences less noise at that location.

One disadvantage of the noise reduction system disclosed in the 2005/0226434 publication is that the system only can reduce noise by turning on the speakers proximate to the user's location when the user is relatively stationary at the location. The system cannot provide an effective noise cancellation for the user when the user is moving.

The apparatus and method for reducing noise for a moveable target of the present disclosure solves one or more of the problems set forth above.

SUMMARY OF THE INVENTION

In one aspect, the present disclosure is directed to a noise control system for controlling a noise level around a moveable target. The noise control system includes a detecting system for detecting a location and movement of the target, and a noise cancellation system. The noise cancellation system includes a sensor for dynamically sensing a noise acoustic wave at the location of the target. The noise cancellation system is configured to be responsive to a detection of the location of the target by the detecting system and the sensed noise acoustic wave by the sensor, and provide a noise cancellation wave to a first space at and around the location of the target. The noise cancellation system is further configured to be responsive to a detection of the movement of the target by the detecting system and the sensed noise acoustic wave, and provide a noise cancellation wave to a second space to cover the moving target. The second space is larger than the first space.

In another aspect, the present disclosure is directed to a method for providing reduction of a noise level for a moveable target. The method includes detecting a first location of the target and detecting a noise acoustic wave at the first location. A noise cancellation wave is provided in response to the noise acoustic wave to a first space at and around the first location of the target. A movement of the target is detected, and a noise cancellation wave is provided in response to the noise acoustic wave to a second space to cover the moving target. The second space is larger than the first space.

DETAILED DESCRIPTION

Figure 1:
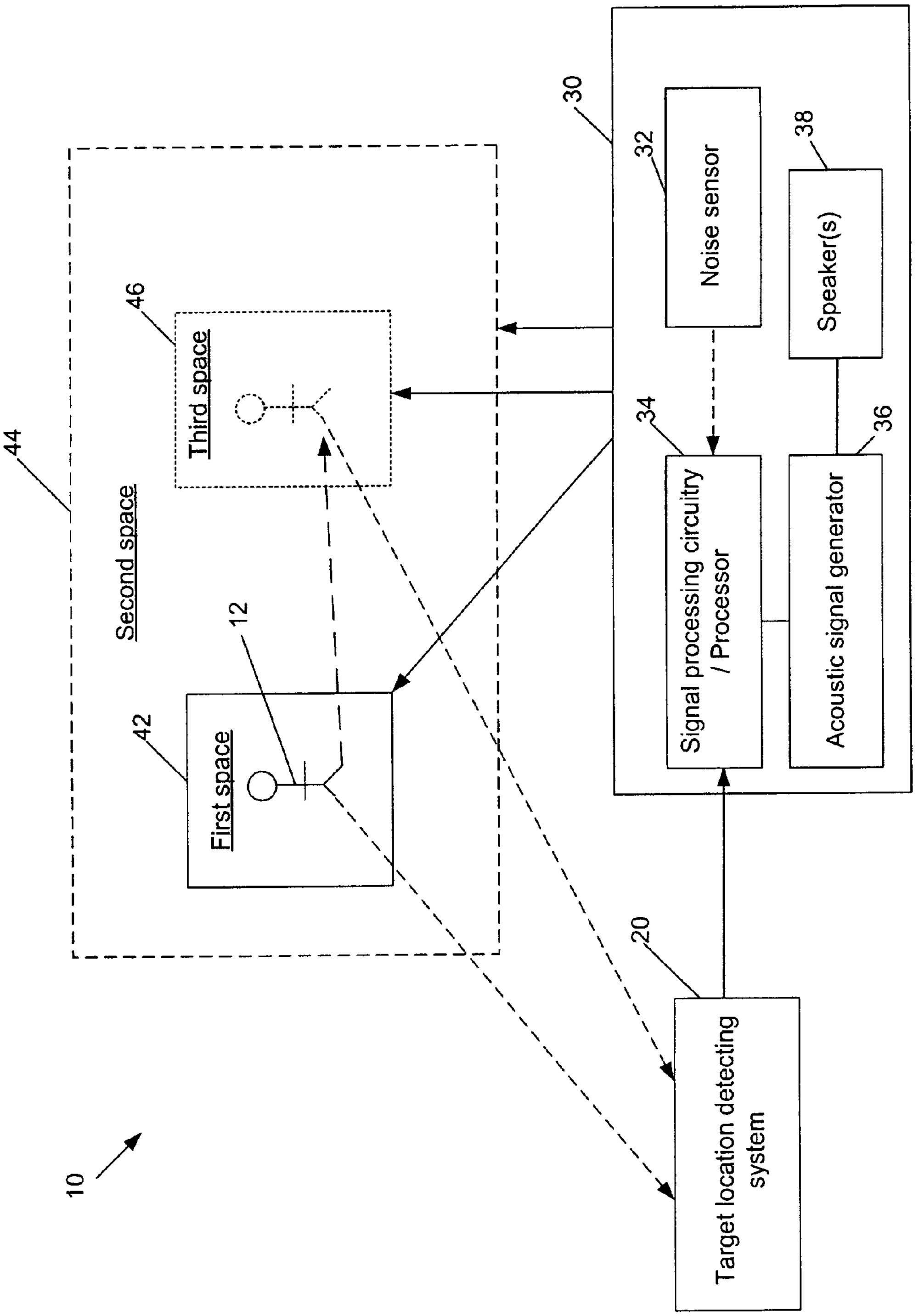
FIG. 1 is a schematic illustration of an exemplary disclosed noise control system for controlling a noise level around a moveable target.

FIG. 1 shows an exemplary noise control system 10 for controlling a noise level around a moveable target 12 in accordance with one embodiment. The moveable target 12 can be a worker at a work site, such as an operator of a vehicle or a machine. In this example, the noise control system 10 includes a target location detecting system 20 for detecting a location and/or movement of the target 12, and a noise cancellation system 30 for reducing the noise level at and around the location of the target 12.

In one embodiment as shown in FIG. 1, the noise cancellation system 30 includes a noise sensor 32, signal processing circuitry, for example a processor 34, and an acoustic signal generator 36. In use, the noise sensor 32 can be any type of sensor or device that can measure the noise. For example, the noise sensor 32 may include a microphone or other suitable transducer that is configured to dynamically sense a noise acoustic wave at the target's location. The noise sensor 32 may be attached to the moveable target 12 and move with the target 12. The noise sensor 32 may be connected to the processor 34 through either a wireless network or a wired network and transfer a noise signal representative a noise profile at the target's location to the processor 34. The processor 34 processes the noise signal received from the noise sensor 32 and generates a noise cancellation signal corresponding to the noise profile at the target's location. The noise cancellation signal may then be transmitted to the acoustic signal generator 36, which generates a noise cancellation wave based on the noise cancellation signal received from the processor 34 and transmits the noise cancellation wave to a space at and around the target's location to interfere the noise acoustic wave, thereby reducing the noise at and around the target's location. In one embodiment, the noise cancellation wave is a sound wave which has a same amplitude and opposite phase to the noise acoustic wave, and therefore, the noise cancellation wave cancels out or reduces the amplitude of the noise acoustic wave at and around the target 12. In one embodiment, the acoustic signal generator 36 includes at least one speaker 38 for generating the noise cancellation wave to the space at and around the target's location.

As shown in FIG. 1, the processor 34 is connected to the target location detecting system 20 and receives signals representative of the location of the target 12. The processor 34 is further configured to take into account the location of the target 12 and control the acoustic signal generator 36 to direct the generated noise cancellation wave to a space at and around the location of the target 12. For example, the processor 34 may adjust the direction of the speaker 38 to direct the noise cancellation wave following the moving target 12. For another example, the acoustic signal generator 36 may include multiple speakers around a target area (e.g., a cabin of a vehicle, a work site), and the processor 34 is configured to selectively turn on and adjust the volume of some speakers close to the target 12 to deliver the noise cancellation wave to a space at and around the target 12.

In one embodiment, the noise control system 10 is configured to track movement of the target 12 and use algorithms for optimization of the noise cancellation for the target 12. For example, when the target location detecting system 20 detects that the target 12 is moving, the noise cancellation system 30 can make tradeoffs in the algorithms to make the volume of the noise cancellation space larger but not as "quiet". Upon detection that the target has stopped moving, the noise cancellation system 30 may reduce the size of the noise cancellation space, while increasing the noise cancellation quality. The implementation of such optimization is described in detail below.

In one embodiment, when the target 12 moves as determined by the target location detecting system, the noise acoustic wave received by the noise sensor 32 changes. The noise sensor 32, which generated the noise signal representative of the noise profile of a first space 42 at and around the target location, now generates a new noise signal representative of a noise profile of a second space 44 which is larger than the first space and covers the moving target. In one embodiment, the new noise signal represents the noise profile in the larger second space 44, and therefore, for the purpose of reducing the noise level around the target, the new noise signal may be not as accurate as the original noise signal which represents the noise profile in the smaller first space 42. In response to the detection of the movement of the target 12 and the new noise signal, the processor 34 adjusts the acoustic signal generator 36 to produce a new noise cancellation wave and direct the noise cancellation wave to cover the second space 44 to reduce the noise in the second space 44. In directing the acoustic signal to the second space 44, in one embodiment, the processor 34 may adjust the speaker 38 to produce sound in a wider angle. In another embodiment, in which multiple speakers are used, the processor 34 may selectively turn on more speakers to cover the larger second space 44. When the target stops moving, upon the detection of the target being stationary, the processor 34 adjusts the acoustic signal generator 36 to produce a noise cancellation wave in response to a noise profile in a third space 46 at and around the stationary target's location, which is smaller than the second space 44. The processor 34 adjusts the speaker or speakers 38 to deliver the noise cancellation wave to the third space 46 to reduce the noise in the third space 46 at and around the target 12.

The target location detecting system 20 can be any suitable means for detecting the location of the target. In one embodiment, the target location detecting system 20 may include a Global Positioning System (GPS) for detecting the location of the target 12. In another embodiment, the target location detecting system 20 includes at least one transmitter for generating signals, and at least one receiver for receiving the signals. Either the transmitter or the receiver is attached to the target 12, and the detecting system 20 is configured to determine the location of the target 12 based on the time of arrival of the signals from the transmitter to the receiver. In yet another embodiment, the detecting system 20 may include a Doppler radar system for detecting the location of the target 12. In a further embodiment, the detecting system 20 may include a triangulation system for detecting the location of the target. In yet another embodiment, the detecting system 20 may include an optical system for detecting the location of the target 12, for example, a camera. In yet another embodiment, the detecting system 20 may include a sensor attached to the target 12. The sensor could be configured to detect a change of the noise amplitude indicative of the movement of the target 12. Alternatively, the sensor may be configured to detect a change of the noise frequency indicative of the movement of the target 12.

Figure 2:
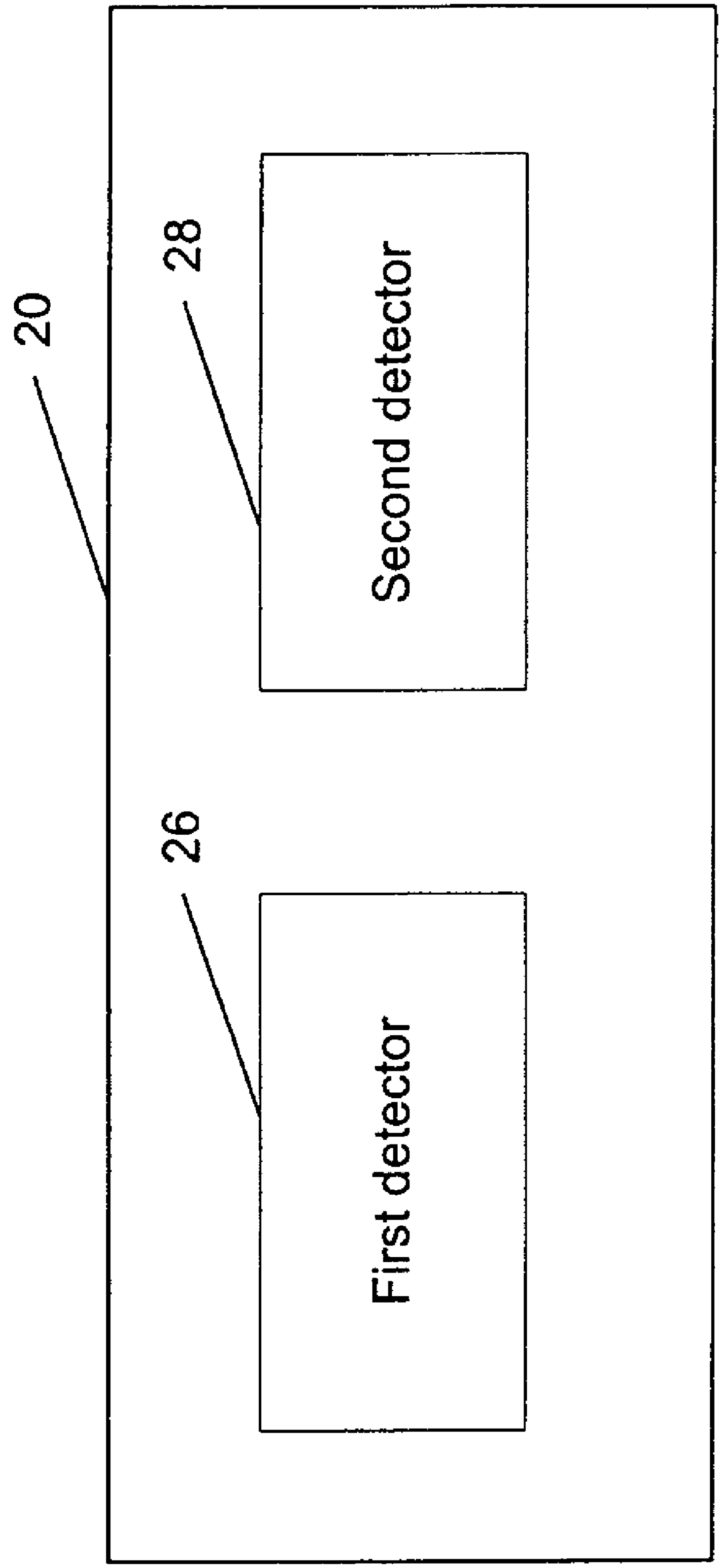
FIG. 2 is a schematic illustration of an exemplary disclosed target location detecting system.

In a further embodiment as shown in FIG. 2, the detecting system 20 may include a first detector 26 for detecting the location of the target 12, and a second detector 28 for detecting the movement of the target 12. The first detector 26 may be implemented with the GPS or other location detectors as described above. The second detector 28 may be implemented using a sensor configured to detect the change of the amplitude or the frequency of the noise acoustic wave indicative of the movement of the target 12. In one embodiment, the second detector 28 may be implemented using the noise sensor 32 as described above.

INDUSTRIAL APPLICABILITY

The disclosed system for reducing'noise for a movable target may be implemented in any environment to reduce the noise that a user within that environment experiences, including a work machine cabin, a work site, etc. By implementing the disclosed system, the noise level perceived by a worker at the work site or an operator in the work machine can be reduced. The operation of the system for reducing noise for a movable target will now be explained.

Figure 3:
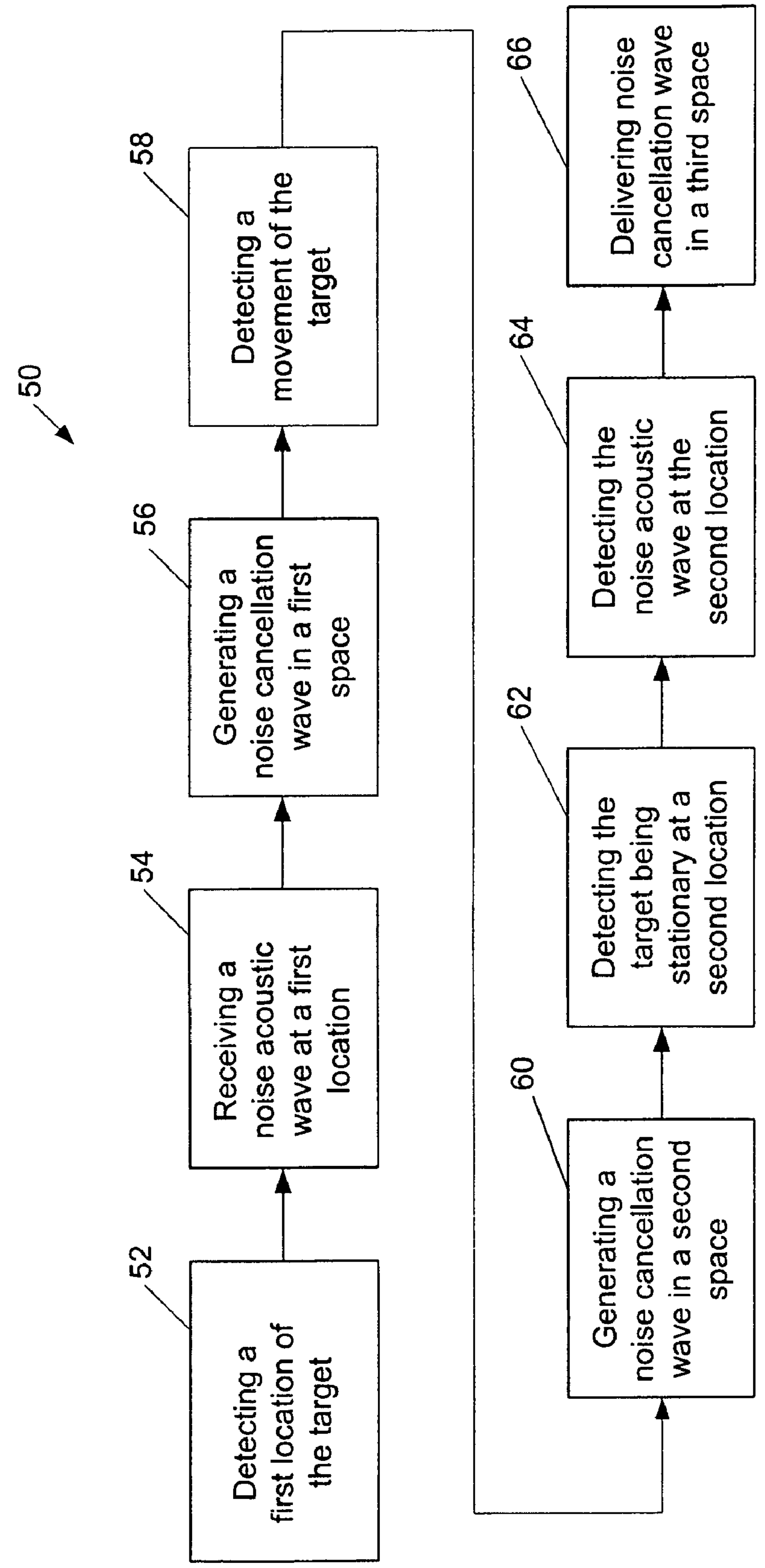
FIG. 3 is a flow chart illustrating an exemplary disclosed method for providing reduction of a noise level around a moveable target.

FIG. 3 illustrates a process 50 for providing a noise cancellation to a moveable target 12. At step 52, a first location of the target 12 is detected by the target location detecting system 20. The target location detecting system 20 sends the target location information to the processor 34 of the noise cancellation system 30. At step 54, the noise sensor 32, which may be attached to the target 12, receives a noise acoustic wave at the first location of the target 12, and sends a noise signal representative of the noise profile at the first location to the processor 34. At step 56, the processor 34 processes the noise signal from the noise sensor 32 and instructs the acoustic signal generator 36 to generate and deliver a noise cancellation wave based on the noise profile at the first location to a first space 42 at and around the first location to interfere with the noise in the first space 42, and thereby to reduce the noise level around the target 12. At step 58, the target location detecting system 20 detects a movement of the target 12. In response to the detection of the movement of the target 12, the processor 34 adjusts the acoustic signal generator 34 to deliver the noise cancellation wave to a second space 44 which is larger than the first space 42 and covers the moving target 12, at step 60. The noise cancellation wave is generated based on a noise profile associated with the second space 44. The target location detecting system 20 detects the target 12 being stationary at a second location at step 62. At step 64, the noise sensor 32 detects the noise acoustic wave at the second location. At step 66, in response to the detection of the target 12 being stationary, the processor 34 adjusts the acoustic signal generator 34 to deliver the noise cancellation wave to a third space 46, which is smaller than the second space 44 and covers the stationary target 12. The noise cancellation wave is generated based on the noise acoustic profile associated with the third space 46.

Several advantages over the prior art may be associated with the noise control system. A target, for example, a worker at a work site or an operator in a vehicle or of a machine, sometimes move from one area to another during working. The prior art can only provide a fixed "quiet space", and if the target moves outside of the "quiet space", the target will not be protected from the noise. The disclosed system can provide a "quiet space" to cover the moving target by enlarging the "quiet space", and reducing the "quiet space" when the target is stationary. The disclosed system, therefore, can provide an optimal noise attenuation to the moveable target.

It will be apparent to those skilled in the art that various modifications and variations can be made to the noise control system. Other embodiments will be apparent to those skilled in the art from consideration of the specification and practice of the disclosed noise control system. It is intended that the specification and examples be considered as exemplary only, with a true scope being indicated by the following claims and their equivalents.

What is claimed is:

1. A noise control system for controlling a noise level around a moveable target, comprising:

a detecting system configured to detect a location and movement of the target;

a noise cancellation system including a sensor for dynamically sensing noise at the location of the target, and being configured to be responsive to detection of the location of the target by the detecting system and the sensed noise, and to provide a noise cancellation wave to a first space at and around the location of the target, wherein the noise cancellation system is further configured to be responsive to detection of the movement of the target by the detecting system and the sensed noise, and to provide a noise cancellation wave to a second space to cover the moving target, wherein the second space is larger than the first space.

2. The noise control system of claim 1, wherein the noise cancellation system is further configured to be responsive to detection of the target being stationary at a new location and a noise at the new location sensed by the sensor, and to provide a noise cancellation wave to a third space at and around the new location, wherein the third space is smaller than the second space.

3. The noise control system of claim 1, wherein the detecting system includes a Global Positioning System for detecting the location of the target.

4. The noise control system of claim 1, wherein the detecting system includes at least one transmitter for generating signals, and at least one receiver for receiving the signals, one of the transmitter and receiver being attached to the target, and the detecting system is configured to determine the location of the target based on the time of arrival of the signals from the transmitter to the receiver.

5. The noise control system of claim 1, wherein the detecting system includes a Doppler radar system for detecting the location of the target.

6. The noise control system of claim 1, wherein the detecting system includes a triangulation system for detecting the location of the target.

7. The noise control system of claim 1, wherein the detecting system includes an optical system for detecting the location of the target.

8. The noise control system of claim 1, wherein the detecting system includes a sensor attached to the target for detecting a change in the noise amplitude indicative of a movement of the target.

9. The noise control system of claim 1, wherein the detecting system includes a sensor attached to the target for detecting a change in the noise frequency indicative of a movement of the target.

10. The noise control system of claim 1, wherein the detecting system includes a first detector for detecting the location of the target and a second detector for detecting the movement of the target.

11. A method for providing reduction of a noise level around a moveable target comprising:

detecting a first location of the target;

detecting a noise acoustic wave at the first location;

providing a noise cancellation wave in response to the noise acoustic wave to a first space at and around the first location of the target, wherein the noise cancellation wave interferes with the noise acoustic wave;

detecting a movement of the target; and providing a noise cancellation wave in response to the noise acoustic wave to a second space to cover the moving target, wherein the second space is larger than the first space.

12. The method of claim 11, further including:

detecting the target being stationary at a second location;

detecting a noise acoustic wave at the second location; and providing a noise cancellation wave in response to the noise acoustic wave at the second location to a third space, wherein the third space is smaller than the second space.

13. The method of claim 11, wherein detecting the first location of the target is performed by using a Global Positioning System.

14. The method of claim 11, wherein detecting the first location of the target includes:

providing at least one transmitter for generating signals, and at least one receiver for receiving the signals, wherein one of the transmitter and the receiver is attached to the target; and determining the location of the target based on the time of arrival of the signals from the transmitter to the receiver.

15. The method of claim 11, wherein detecting the first location of the target is performed by using a Doppler radar system.

16. The method of claim 11, wherein detecting the first location of the target is performed by triangulation.

17. The method of claim 11, wherein detecting the first location of the target is performed by an optical system.

18. The method of claim 11, wherein detecting the movement of the target is performed by using a sensor attached to the target for detecting a change of the noise amplitude indicative of a movement of the target.

19. The method of claim 11, wherein detecting the movement of the target is performed by using a sensor attached to the target for detecting a change of the noise frequency indicative of a movement of the target.

20. A noise control system for controlling a noise level around a moveable target, comprising:

a detecting system configured to detect a location and movement of the target; and a noise cancellation system including:

a sensor for dynamically sensing a noise acoustic wave at the location of the target;

signal processing circuitry connected to the sensor; and an acoustic signal generator connected to the signal processing circuitry, wherein said signal processing circuitry is configured to be responsive to a detection of the location of the target by the detecting system and the noise acoustic wave sensed by the sensor to control the acoustic signal generator to provide a noise cancellation wave to a first space at and around the location of the target, and wherein the signal processing circuitry is further configured to be responsive to a detection of the movement of the target by the detecting system and the noise acoustic wave sensed by the sensor to control the acoustic signal generator to provide a noise cancellation wave to a second space to cover the moving target, wherein the second space is larger than the first space.

21. The noise control system of claim 20, wherein the signal processing circuitry is further configured to be responsive to a detection of the target being stationary at a new location and a noise acoustic wave at the new location sensed by the sensor, and to control the acoustic signal generator to provide a noise cancellation wave to a third space at and around the new location, wherein the third space is smaller than the second space.

22. The noise control system of claim 20, wherein the detecting system includes a Global Positioning System for detecting the location of the target.

23. The noise control system of claim 20, wherein the detecting system includes at least one transmitter for generating signals, and at least one receiver for receiving the signals, one of the transmitter and receiver being attached to the target, and the detecting system is configured to determine the location of the target based on the time of arrival of the signals from the transmitter to the receiver.

24. The noise control system of claim 20, wherein the detecting system includes a Doppler radar system for detecting the location of the target.

25. The noise control system of claim 20, wherein the detecting system includes a triangulation system for detecting the location of the target.

26. The noise control system of claim 20, wherein the detecting system includes an optical system for detecting the location of the target.

27. The noise control system of claim 20, wherein the detecting system includes a sensor attached to the target for detecting a change of the noise amplitude indicative of a movement of the target.

28. The noise control system of claim 20, wherein the detecting system includes a sensor attached to the target for detecting a change of the noise frequency indicative of a movement of the target.

29. The noise control system of claim 20, wherein the detecting system includes a first detector for detecting the location of the target and a second detector for detecting the movement of the target.

* * * * *